Feb. 27, 1962 F. PETERS 3,023,258
HERMETICALLY SEALED GALVANIC SMOOTHING OR STABILIZATION CELL
Filed May 2, 1958 5 Sheets-Sheet 1
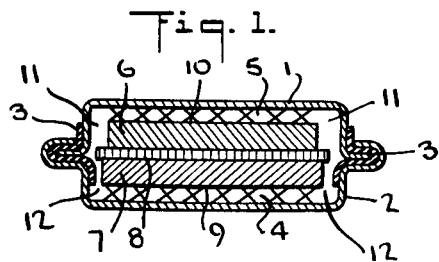
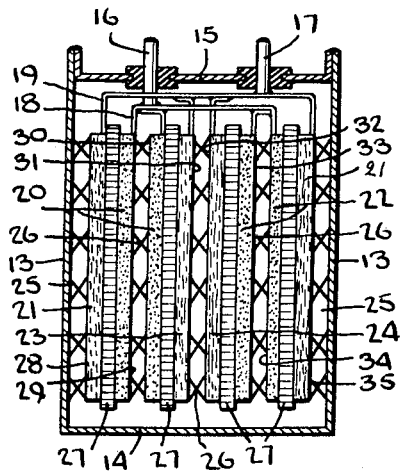
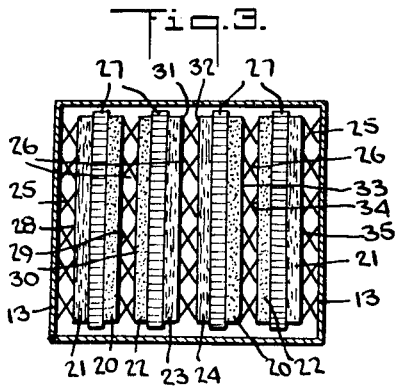
INVENTOR.
FREIMUT PETERS
BY
AGENT Feb. 27, 1962     F. PETERS     3,023,258
HERMETICALLY SEALED GALVANIC SMOOTHING OR STABILIZATION CELL
Filed May 2, 1958     5 Sheets-Sheet 2

INVENTOR.
FREIMUT PETERS

Feb. 27, 1962 F. PETERS 3,023,258
HERMETICALLY SEALED GALVANIC SMOOTHING OR STABILIZATION CELL
Filed May 2, 1958 5 Sheets-Sheet 3
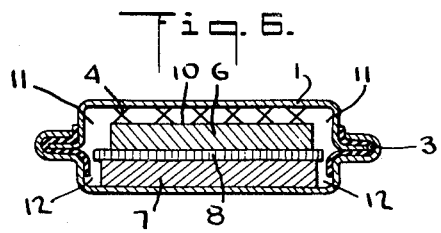
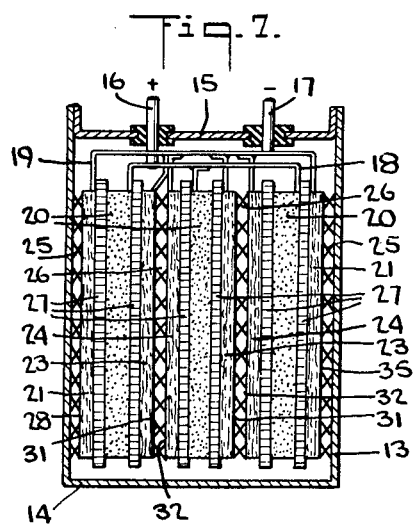
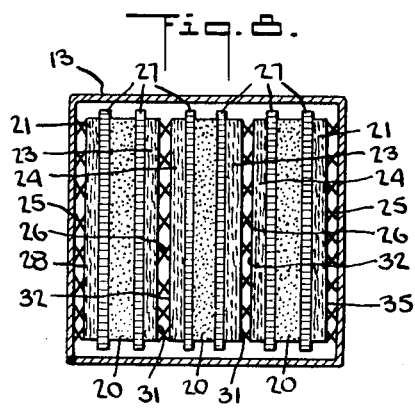
INVENTOR.
FREIMUT PETERS
BY
AGENT Feb. 27, 1962 F. PETERS 3,023,258
HERMETICALLY SEALED GALVANIC SMOOTHING OR STABILIZATION CELL
Filed May 2, 1958 5 Sheets-Sheet 4
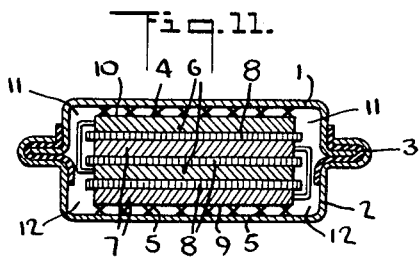
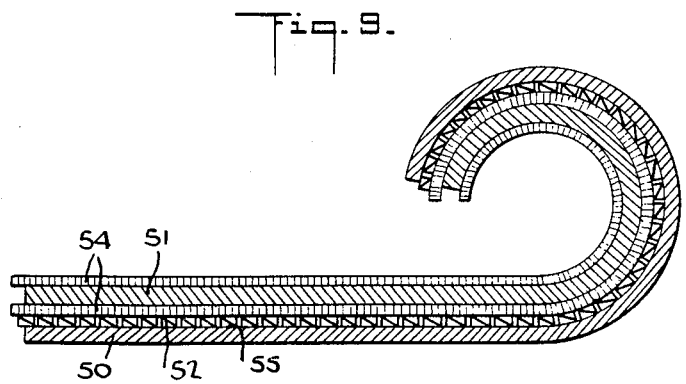
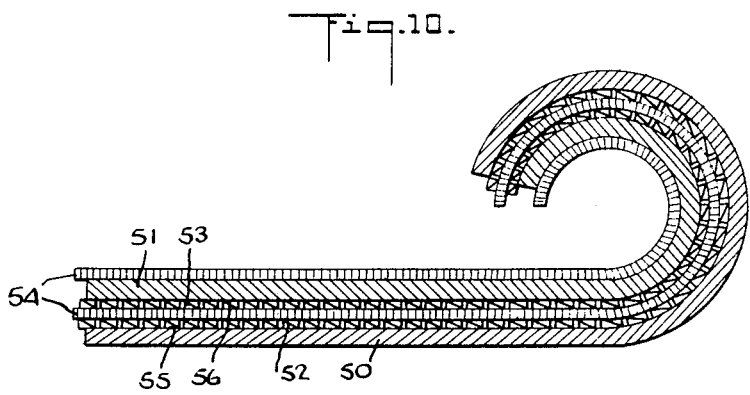
INVENTOR.
FREIMUT PETERS
BY
AGENT Feb. 27, 1962 F. PETERS 3,023,258
HERMETICALLY SEALED GALVANIC SMOOTHING OR STABILIZATION CELL
Filed May 2, 1958 5 Sheets-Sheet 5
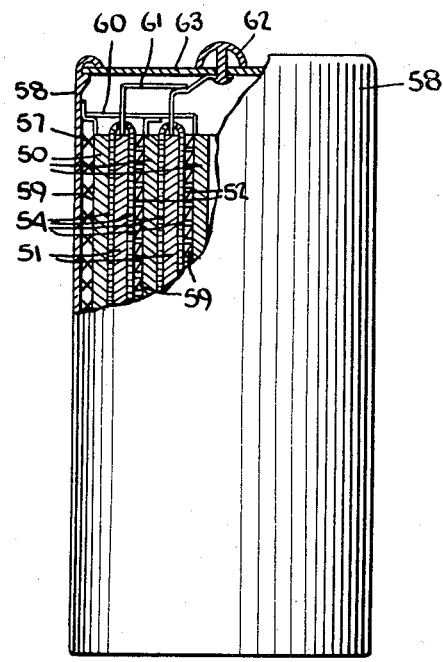
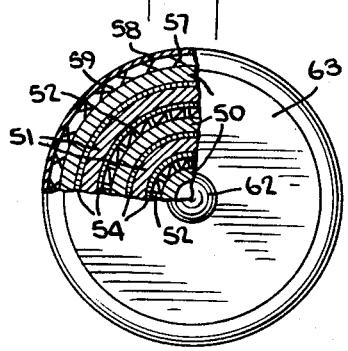
INVENTOR.
FREIMUT PETERS
BY
AGENT United States Patent Office 3,023,258
Patented Feb. 27, 1962

3,023,258
HERMETICALLY SEALED GALVANIC SMOOTH-
ING OR STABILIZATION CELL
Freimut Peters, Hagen, Westphalia, Germany, assignor to
Accumulatoren-Fabrik A.G., Hagen, Westphalia, Germany, a corporation of Germany
Filed May 2, 1958, Ser. No. 732,485
5 Claims. (Cl. 136—6)

The present invention relates to hermetically sealed galvanic cells useful as current smoothing or stabilizing circuit elements, and more particularly to alkaline cells of this type.

Basically, storage batteries according to the present invention comprise porous electrodes of potentially changeable, opposite polarity, porous separators embedded between each two adjacent electrodes of opposite polarity, an electrolyte fixed in the electrodes and the separator by capillary action, and electrode surface portions accessible to evolving gases in the cell to consume such gases.

In known nickel-cadmium cells of the alkaline type, nickel hydroxide is used as active material in the positive electrode and the active material in the negative electrode is a cadmium material. Porous sintered metal electrodes i.e. may be impregnated with the active materials by immersing them in solutions of nickel and cadmium salts, for instance, nitrates, and chemically depositing the nickel and cadmium active materials in the plates in an electrolyte of 25% sodium or potassium hydroxide solution. In general, such cells were provided with means for adding electrolyte and vent means to permit evolving gases to escape from the cell.

More recently, hermetically sealed storage batteries of this type have been produced which were so constructed and treated that only oxygen evolves during operation and this oxygen is consumed at freely accessible electrode surface portions by electrochemical reaction. While these cells have fundamentally the same parts as the open type, they require no additional electrolyte or other servicing. However, their predominant sign resides in the use of a nickel compound as active material in the positive electrode. After charging the battery, the nickel compound is in an undefined state of oxidation and tends strongly toward self-discharge. Therefore, such cells cannot be used as current smoothing devices because they are subject to a considerable voltage drop.

It is accordingly the primary object of the present invention to provide a hermetically sealed smoothing or stabilizing galvanic cell, preferably of the alkaline type, which does not tend to self-discharge and the efficiency of which is so high that it may replace larger-size smoothing or filter condensers for smoothing or flattening a direct current having an alternating current superimposed thereon.

This and concomitant objects are accomplished in accordance with the present invention by providing a current smoothing galvanic cell with electrodes all having the same active material as the active material in the negative electrodes of conventional cells. In alkaline nickel-cadmium cells, for instance, all electrodes have a cadmium active material.

In all other respects, the structure of the galvanic cells according to the present invention is basically similar to that of conventional hermetically sealed storage batteries. The electrolyte is fixed by capillary action in the pores of the electrolyte-resistant porous separator embedded between electrode plates of opposite polarity as well as in the pores of the porous electrode plates. Since the electrolyte is so fixed, surface portions of the electrodes which are covered only by a thin film of electrolyte are readily accessible to and in contact with the gassing chambers in the sealed cell. Evolving gases are thus consumed on said electrode surface portions.

According to one preferred embodiment of the present invention, the electrodes are thin plates which, due to their thinness, give a very large effective surface. In some cases, sheet- or foil-like electrodes may be used the inner resistance of which is extremely low and which, due to such a low inner resistance, have an especially high stabilizing and smoothing effect. Such cells permit a correspondingly high reactive current. Thin electrodes of this type may be produced by any conventional method and may have a gage between 0.1 mm. and 2 mm., for instance, of 0.2 mm. to 0.3 mm. The separators are then correspondingly thin.

However, the electrodes useful in the cells of the present invention may also have a conventional gage of up to about 3 mm. or 4 mm. although the very thin electrodes are the preferred ones.

The invention will be more fully understood by reference to the following detailed description of certain preferred embodiments thereof, taken in conjunction with the drawings annexed hereto, wherein:

FIG. 1 is a vertical section of a button- or disc-like cell according to the present invention;

FIG. 2 is a longitudinal section of a cell of quadrangular cross section;

FIG. 3 is a top view of the cell of FIG. 2;

FIG. 6 is a vertical section of a different embodiment of a counter cell according to the present invention;

FIG. 7 is a longitudinal section of a different embodiment of a cell according to the present invention;

FIG. 8 is a top view of the cell of FIG. 7;

FIGS. 9 and 10 illustrate different embodiments of flexible electrode arrangements similar to those of FIGS. 4 and 5, respectively;

FIG. 11 is a vertical section of yet another embodiment of a counter cell according to the present invention with several thin electrodes;

FIG. 12 is a side view of a cylindrical cell, partially in section along the cylinder axis; and FIG. 13 is a top view of the cell of FIG. 12, partially in section to show a portion of the spirally wound electrodes.

Figure 4:
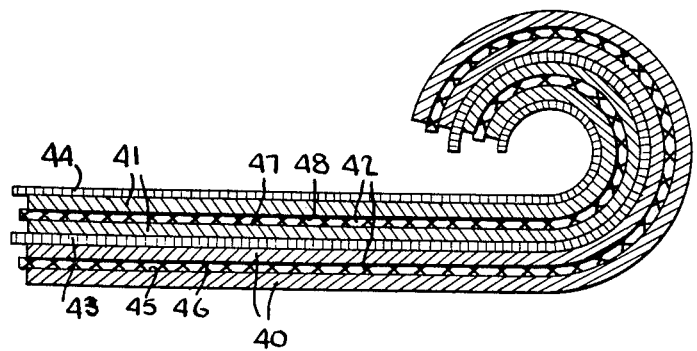
FIG. 4 illustrates an arrangement of flexible electrodes which are spirally wound.

FIGS. 1 to 4, 10, and 11 are embodiments of cells wherein gas-contacting surfaces are associated with the electrodes of both polarities and which are useful for current flow in either direction. FIGS. 5 to 9, 12, and 13 constitute embodiments in which gas-contacting surfaces are associated only with the electrode or electrodes of one polarity.

Referring now to FIG. 1, there is shown a flat cell housing consisting of upper housing part 1 and lower housing part 2. The housing is of any suitable metal, such as nickel plated steel or nickel, for instance, and for reasons hereinbelow explained, the two housing parts are insulated from each other by insulating inserts 3. Any conventional insulating material may be used, such as natural or synthetic rubber, plastics, for instance, polyamide or polyvinyl chloride resins, and like electrically insulating materials.

Two electrodes 6 and 7 are mounted in the cell housing, with separator 8 embedded between the electrodes. Preferably, the electrodes and the separator are porous. The separator may suitably consist of a mat or web of any non-conductive fibrous material, or of a filter paper of cellulose or synthetic fibers, or of a semi-permeable pellicle of cellulose or plastic, or of a microporous plastic membrane, or a combination of these different layers.

The invention is not concerned with the specific separator or electrode materials. The only essential feature of the separator is its permeability for the electrolyte. On the other hand, it is preferably so constructed as to be impermeable to the gas bubbles created during operation of the cell.

Preferably, the porous electrodes 6 and 7 are sintered metal electrodes, such as sintered nickel electrodes, which are well known per se and which provide a very large active surface. More particularly, the effective surfaces of the electrodes are the outside surfaces 9 and 10 which serve for the electrochemical gas reaction. Therefore, these surfaces must be in contact or communication with the gassing chambers and must be coated with a thin electrolyte film.

Access to the surfaces 9 and 10 is obtained by providing spacers 4 and 5 between the surfaces and the walls of the cell housing. As shown, the spacers are support frameworks with large interspaces. They may be either of electrically conductive material, such as a metal, or they may be non-conductive, i.e. of plastic or the like. If the spacers are metallic, their surfaces will aid in the adsorption and consumption of the evolving gases (oxygen). Metallic spacers will also electrically connect the electrodes with the cell housing. In this case, the housing parts are separated by insulation 3 to avoid short-circuiting and the housing parts 1 and 2 may be used directly as the positive and negative terminals for the cell.

It is particularly advantageous to make at least one of the spacers resilient. This will not only produce a more reliable electrical contact between the electrically connected cell parts but it will also exert a moderate pressure of the inner surfaces of the electrodes against the separator so that gas bubbles will more readily escape laterally between the electrode and the separator into the gassing chambers rather than to penetrate through the inpregnated pores of the separator.

The gassing chambers in the cell include the spaces 11 and 12 which, however, are of smaller volume and effectiveness than the spaces formed by the spacers 4 and 5.

The square cell of FIGS. 2 and 3 is constructed according to the same principles as the flat disc cell of FIG. 1. The cell housing consists of bottom 14, side walls 13, and sealing cover 15. Preferably, all housing parts are of metal. The terminals 16 and 17 of positive and negative polarity, respectively, are mounted in cover 15 and are insulated therefrom. Electrical conductors 18 and 19 in the interior of the cell connect respective ones of the terminals or lead-ins with their associated electrodes, lead-in 16 being connected to the two electrode pairs 20 and 22 while terminal 17 is connected to electrodes 21, 23, and 24. As shown in their preferred embodiment, the electrodes are sintered metal plates which are highly porous. Between the outermost electrodes 21 and the housing walls 13 there are provided spacers 25 while spacers 26 are mounted between electrodes 20 and 22 and between electrodes 23 and 24. The spacers are substantially identical with the spacers of FIG. 1. With metallic spacers, the outer electrodes are electrically connected with the housing while adjacent electrodes of the same polarity are also electrically interconnected. Thus, electrodes 20, 22 and 23, 24 form double electrodes interspaced by the respective spacers.

Separators 27 are embedded between electrodes of different polarity, i.e. between plates 21 and 20, 22 and 23, 24 and 20 as well as 22 and 21. The separators and their mounting are similar to the arrangement described in connection with FIG. 1. As in this embodiment, the back sides of the electrodes which are not covered by the separators and which face away from the electrodes of different polarity are held readily accessible to evolving gases in the cell by the spacers 25 and 26. These gas-contacting surface portions 28 through 35 with their enlarged areas serve for the electrochemical reaction of the gas so that they form the actually effective electrode surfaces in respect of the gas adsorption. These gas-contacting surfaces which are in communication and contact with the gassing chambers must be coated with a thin electrolyte film to make the electrochemical process possible.

FIG. 4 illustrates a spirally wound electrode arrangement with very thin and flexible electrodes. This arrangement comprises a pair of electrodes 40 of one polarity and a pair of electrodes 41 of the opposite polarity. Spacers 42 hold apart the electrodes of each pair while porous separators 43 and 44 are respectively embedded between adjacent electrodes 40 and 41, and covers the innermost electrode 41. In every other essential respect, the electrode, spacer and separator arrangement is similar to that of the other embodiments and the gas-contacting surface portions 45 through 48 are again held free to adsorb evolving gases by spacers 42.

Figure 5:
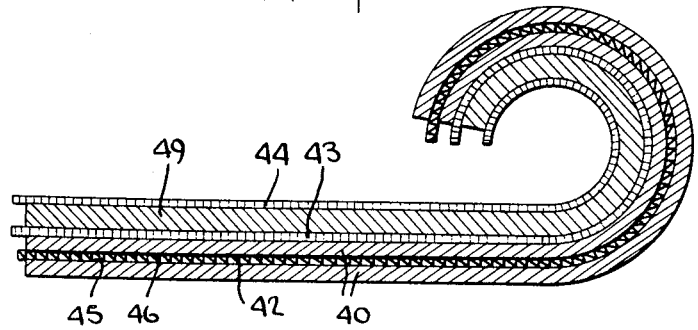
FIG. 5 shows an arrangement somewhat similar to that of FIG. 4.

In the slightly different embodiment of FIG. 5 where like reference numerals indicate the same parts as in FIG. 4, the electrode of one polarity is a single electrode 49 instead of being formed as a double electrode. Preferably, the single electrode has positive polarity. In this case, the consumption of evolving oxygen during the current flow through the cell is effected at the surfaces 45 and 46 of the double electrode of negative polarity.

The cell of FIG. 6 being quite similar to that of FIG. 1, like reference numerals indicate like parts in the two embodiments. In the embodiment of FIG. 6, one of the spacers is omitted so that electrode 7 contacts the housing part 2, offering no free gas-contacting surface. Similar to the corresponding arrangement of FIG. 5, the electrode 7 is preferably given positive polarity while electrode 6 has the negative polarity. In this case, too, oxygen consumption will take place at the free surface 10 of the negative electrode.

FIGS. 7 and 8 illustrate cells of a structure similar to the cell of FIGS. 2 and 3, like reference numerals indicating like parts. As in the embodiment of FIG. 6, one of the spacers is omitted, electrodes 20 being constructed as single electrodes and being preferably of positive polarity. The cell has a total of three positive electrodes and six negative electrodes 21, 23 and 24, the free back sides 28, 31, 32, and 35 of the negative electrodes serving as gas-contacting surfaces. In all other respects, the cell is constructed and operates like the cell of FIG. 2.

FIGS. 9 and 10 illustrate other embodiments of wound electrodes of thin, flexible sheets of metallic material containing the active mass. Referring to FIG. 10, there is provided an electrode 50 of one polarity and an electrode 51 of the opposite polarity, with metal spacers 52 and 53 arranged along the electrode sides facing each other. A separator 54 is mounted between the spacers and another such separator covers electrode 51. The metal spacers may be of nickel or nickel-plated iron and should have large apertures or interspaces 55 and 56 which serve as the gas-contacting areas. The metal spacers may be wire mesh or sieve-like structures, expanded metal elements, and the like.

The layers may obviously be slightly rearranged, for instance, in the following order: metal spacer, electrode, separator, counter-electrode, metal spacer and separator. The operation of this cell will be self-evident from a consideration of the other and basically similar embodiments.

In the similar cell of FIG. 9, like reference numerals are applied to like parts. In this case, the spacer 53 is eliminated so that only surface 55 of electrode 50 serves as gas-contacting surface. Preferably, this is the negative electrode while 51 is the positive electrode of the cell.

The cell of FIG. 11 is similar to the cell of FIG. 1 and like parts therein are indicated by like reference numerals. The difference between the two embodiments lies in the fact that the cell of FIG. 11 has a double electrode of one polarity and a double electrode of the opposite polarity, each pair of electrodes being interconnected. This arrangement increases the electrode surface and reduces the current density. Therefore, such cells can be charged with a higher rate of current than the cells of FIG. 1.

The cell of FIG. 11 may be further improved by subdividing one or more of the electrodes of one polarity or of both polarities into double electrodes spaced apart by spacers to provide additional gas-contacting electrode surface portions. Since the increase in contact area reduces the gas pressure in the cell, such cells may be charged with even higher rates of current than the cell of FIG. 11.

FIGS. 12 and 13 illustrate an accumulator containing an electrode arrangement according to FIG. 9. The preferably negative electrode 50 forms the outer winding and is separated from the pressure-resistant metal housing 58 by spacer 57. The separators 54 cover the surfaces of the positive electrodes 51. The electrode surfaces 59 of the spirally wound electrodes 50 serve as the oxygen-consuming contact areas. The electrode 50 is electrically connected with the housing by conductors 60 while the positive electrode 51 is connected with the contact button 62 by means of conductors 61. The contact button is insulated by being mounted in the plastic cover 63 of the cell. The cover is held in place and hermetically seals the cell by means of the beaded rim of the housing wall, as illustrated. Obviously, the electrode arrangements of FIGS. 4, 5 or 10 may equally be mounted in a spirally wound roll in a pressure-resistant cell according to FIGS. 12 and 13.

All the electrodes in the illustrated embodiments are impregnated with the same active material, i.e., a cadmium material in the case of alkaline nickel-cadmium batteries.

The galvanic cells of the invention operate as follows:

When the cell is connected in an electric circuit and current flows therethrough, oxygen evolves at the electrode connected to the positive pole while a small equivalent part of the negative electrode is cathodically reduced. The evolving oxygen is electrochemically reacted on the freely accessible gas-contacting surfaces of the electrode connected to the negative potential so that only minor gas pressures develop in the hermetically sealed cell.

Since one electrode has the potential of the conventional negative electrode and the other electrode has the potential of the conventional positive electrode of hermetically sealed storage batteries, the voltage of the galvanic cell of the present invention corresponds to the voltage of conventional hermetically sealed cells with the usual active electrode materials. On the other hand, the capacity of the present cell differs from that of conventional cells.

Since the negative and the positive electrodes are of identical material, the capacity of the cell is small compared to the storage capacity of the negative electrode. However, it has been found that such cells have some capacity despite the identity of the electrodes, such capacity being about one tenth to one fiftieth that of the electrode with negative potential.

The amperage or current intensity with which such galvanic cells are charged may be so selected that the negative electrode will be charged in about 5 to 10 hours.

The sealed cells of the present invention may be considered as symmetrical cells because of the identity of their electrodes. They have usefulness and advantages of a manifold nature over hermetically sealed cells with different active materials in their electrodes of opposite polarity.

For instance, the cells of the present invention may be arranged as fixed circuit elements in radio circuits as smoothing or current flattening devices. As such, they serve as low-ohmic alternating current resistances to smoothen and flatten a direct current having an alternating current superimposed thereon. They operate so effectively in this manner that such galvanic cells may replace condensers of considerable capacity. For example, a cell having a storage capacity of 5 ma. h. may replace a condenser of 10,000 microfarad.

In view of their small capacity, the galvanic cells of the present invention reach their full effectiveness much faster after current flows therethrough than the conventional hermetically sealed cells, particularly if the cells are in discharged condition at the time the current is applied thereto. Furthermore, the cells can be continuously charged with a considerably higher amperage than conventional cells. As much as twice as high an amperage or more has been successfully applied for a short time than is possible with conventional cells.

The principles of the present invention may be applied to all types of hermetically sealed galvanic cells, for instance, to the very small cells which are called button or disc cells as well as to larger cells. Counter cells, too, may be built according to the same principles but they have usually larger dimenisons because of the higher amperages applied thereto. None of these cells require servicing and they remain permanently sealed.

Since the electrodes of the cells are identical, i.e. their active material is in the same oxidation condition, before current is applied thereto, the galvanic cells of the present invention have no predetermined polarity and their electrodes may be interchangeably connected either to the positive or the negative potential. Thus, if the current in a circuit containing such a cell is accidentally or purposely reversed, the electrodes merely interchange their functions and the cell continues to operate without interruption. Therefore, such cells are secure against current reversal and they may also be used in pure alternating current circuits.

As is clear from the foregoing description, freely accessible surface portions of the electrodes serve to consume evolving oxygen and since it is advantageous to make these surface portions as large as possible, they may be constituted by one surface of a pocket electrode, a sintered electrode, or a pressed electrode, as conventionally used in cells of this type.

In alkaline cells, the active electrode material is preferably primarily or exclusively cadmium oxide or cadmium hydroxide and the electrodes are sintered nickel plates.

The term "cell of potentially changeable, opposite polarity" used herein and in the claims annexed hereto is used for brevity's sake and designates a cell with electrodes of potentially different polarity. Such a cell, as stated hereinabove, has no predetermined polarity, i.e. current may flow through the electrodes in either direction.

Following more detailed examples and data on the dimensions, the composition, and other properties of the electrodes, active materials, separators, spacers, electrolytes, and the like are given without, however, limiting the present invention thereto.

Pocket-type electrodes used in alkaline cells according to the present invention are, for instance, of a thickness of 1.5 mm. to 2.0 mm. They consist, for instance, of one or more individual pockets of a width of 12 mm. to 15 mm. and are composed of perforated nickel-plated steel sheet material. The pockets are filled with active material, for instance, with a negative cadmium active material consisting of at least partly cadmium oxide or cadmium hydroxide which is partly reduced to metallic cadmium in spongy form on the first charge. The active material may also contain a mixture of iron (5% to 30%) and cadmium. Such active materials for negative electrode pockets are well known to the art. The ratio of perforation openings in the perforated nickel-plated steel sheets to non-perforated area is about 10:90.

Wire gauze having 3.600 meshes/sq. cm. to 10,000 meshes/sq. cm. wherein the ratio of meshes to metal surface projected on a basal plane is about 60:40, is also used.

The length of the individual electrodes depends on the size of the cells used. A length of 50 mm. is quite useful.

Each cell must, of course, contain at least one positive and one negative single electrode. The number of the electrodes in each cell is limited with respect to its highest number by the intensity of the current flowing through the cell. Of perforated nickel-plated steel electrodes of a thickness of 1.5 mm., a width of 2x12 mm., and a length of 50 mm. with a ratio of perforations to non-perforated area of 10:90 as they are used in cells illustrated in the annexed drawings there are required 5 negative and 4 positive electrodes to generate steady current between 100 ma. to 200 ma. It is, of course, understood that the present invention is not limited to such electrodes and electrode compositions and sizes.

So-called press electrodes obtained by compressing a mixture of negative cadmium active material and nickel powder in the ratio 50:50 have also proved useful in cells according to the present invention as they are illustrated in FIGS. 2, 3, 7, and 8. The thickness of such press electrode plates is, for instance, about 1 mm., their width about 30 mm., and their height about 60 mm.

Suitable other electrodes which can be used as advantageously as the perforated nickel-plated steel electrodes described hereinabove are foil-like porous sintered frames of nickel powder. The active material is contained in the pores of the sintered framework. The thickness of such sintered electrodes is between 0.1 mm. and 0.5 mm. Depending upon the size of the cell there may be used a smaller or larger number of such sintered nickel foils to provide a set of electrodes as illustrated in FIGS. 2, 3, 7, and 8.

The size of the cell housing is, for instance, 40 mm. x 20 mm. x 35 mm. Another suitable size is, for instance, 35 mm. x 20 mm. x 80 mm., i.e. about twice the size of the first mentioned cell housing.

Electrodes which have proved to be suitable for the button- or disc-like cells of FIGS. 1 and 6 consist, for instance, of tablet-shaped electrodes of a thickness of 1.0 mm. to 1.5 mm. Thereby, the active material is enclosed by perforated steel sheet material or wire gauze. Such tablets are also made of press electrodes consisting of a compressed mixture of active cadmium material and nickel powder. The thickness of such compressed tablets is also between 1.0 mm. and 1.5 mm. Electrodes of sintered nickel powder having embedded in their pores the active material can also advantageously be used. They have a thickness of 0.1 mm. to 0.5 mm. The cell housing has preferably a diameter of about 25 mm. and a height of about 2 mm. The cell size may, of course, vary, and cell housings of a diameter of about 40 mm. and a height of about 8 mm. are also employed.

The electrodes of FIGS. 4, 5, 9, 10, 12, and 13 consist preferably of thin foil-like sintered nickel plates of a thickness between about 0.1 mm. and about 0.4 mm. having embedded in their pores the active material. The width of such sintered nickel strips is between about 10 mm. and about 80 mm. These foil-like sintered nickel plates are spirally wound, after the separators and spacers have been placed therebetween as described hereinabove. The wound electrode spiral has a diameter between about 10 mm. and about 30 mm.

With a diameter of the spirally wound electrode arrangement of 10 mm. to 12 mm. the length of the thin sintered electrode plates is about 75 mm., with a diameter of about 30 mm. their length is about 450 mm.

The separators used in cells according to the present invention have a thickness between about 0.1 mm. and about 0.4 mm. They consist of a single or of several layers of tightly woven textile material. Microporous membranes of plastic material, for instance, of polyamide, polyethylene, polyvinyl chloride, foils of regenerated cellulose or polyvinyl alcohol, or filter paper-like webs of cellulose or said plastic materials may also be used.

The preferred mean radius of the pores of such separators varies.

It is, for instance, in textile webs: Between about $5\mu$ and about $50\mu$;

Microporous plastic foils: Between about $0.1\mu$ and about $10\mu$;

Foils of regenerated cellulose or polyvinyl alcohol: In the dry state they are substantially free of pores; they swell in the electrolyte and, due thereto, permit passage of current;

Filter paper-like webs and waterials: Between about $1\mu$ and about $50\mu$.

If desired, two or more of such separator materials mays be combined.

As explained hereinabove, the dimensions of the separators are dependent on the size of the electrodes as is shown in the drawings. The separators of button- or disc-like cells, for instance, have a diameter between about 25 mm. and about 40 mm. The width of separators used between spirally wound electrodes is, for instance, between about 10 mm. and about 80 mm.

The preferred electrolyte consists of aqueous potassium hydroxide solution of a density of about 1.20 to about 1.25. The amount of electrolyte, of course, is dependent on the size of the cells. The cells contain sufficient amounts of electrolyte so that the electrodes and separators are impregnated therewith but only as much as is retained by capillary action in the pores of the electrodes and separators. For instance, button- or disc-like cells of a diameter of 25 mm. and a thickness of 8 mm. contain about 1000 mg. of said potassium hydroxide electrolyte solution.

The metallic spacer means between the split electrodes and/or the outer surfaces of electrodes and the cell housings are, for instance, as stated hereinabove, wide-meshed wire gauze, sieve-like structures, expanded metal and the like of nickel or nickel-plated iron. The thickness of such spacer means is preferably between about 0.3 mm. and 0.5 mm. Of course, non-conductive plastic material of similar structure may also be used if electrical connection between the electrodes and the cell housing is to be avoided.

When making use of the present invention for lead accumulator counter cells, the electrodes consist of lead foils formed superficially by repeated charging and discharging. Grids cast of lead and containing the active material or paste or so-called lead plates of large surface area are also useful in cells according to the present invention. The active materials of the positive and the negative electrodes being present preferably in a small quantity have in the uncharged cell the same state of oxidation, i.e. consist of lead oxide or lead sulfate. The preparation and formation of such plates is well known to the art so that a more detailed description of such electrodes for lead cells appears not to be required for an understanding of the present invention in its application to lead accumulators. The dimensions of the electrodes, separators, spacers, and housing are about the same as given hereinabove for cells having an alkaline electrolyte. The electrolyte is sulfuric acid of a density between about 1.20 and about 1.25. It is, of course, understood that the housing, the separators, and the spacer means must be resistant against sulfuric acid. The housing, for instance, consists of plastic material or of lead-plated metal.

Alkaline cells according to the present invention operate as follows: Both electrodes contain the same active material, for instance, an active cadmium oxide or cadmium hydroxide material. On passing electric current through the electrodes oxygen is evolved at the anode or positive electrode. The evolved oxygen escapes into the gassing chambers provided in the cells. Said gassing chambers are in contact with metallic surface portions of the electrodes adjacent thereto and having an enlarged gas-contacting area. These gas-contacting areas are not immersed in the electrolyte but are merely covered by a thin electrolyte film. At said surface portions electrochemical reaction of the oxygen takes place and the oxygen is reconverted into the ionic state. Due thereto, the negative electrode is depolarized in such a manner that no hydrogen is evolved thereon. Thereby, the active cadmium material in the negative electrodes serve merely for the adjustment of a favorable and predetermined electrode potential on the passage of current therethrough.

The electrode potential is between about 1.3 v. to 1.5 v. depending on the current intensity. For instance, the terminal voltage is 1.47 v. in button-like or disc-like cells of a diameter of 25 mm. with an amperage of 10 ma. and in like cells of a diameter of 40 mm. the terminal voltage is 1.5 v. with an amperage of 20 ma.

The current density is, of course, dependent on the electrode surface. With button- or disc-like cells of a diameter of 25 mm. the current density is 2.5 ma./sq. cm. When using sintered electrodes, the current density is twice to three times as high.

The cells have only a low capacity. For instance, the output capacity corresponds on discharging with the charging current permissible in continuous operation to a numerical value between one fifth and one tenth of said value in ma. h. or, respectively, a. h. Due to such a low capacity cells according to the present invention respond very rapidly after periods of non-operation, i.e. they attain very rapidly the charging voltage associated with the current intensity.

The direction of current can be reversed without damage to the cell due to the presence of the same active material in both electrodes provided care is taken that the evolved oxygen is in sufficient contact with the respective negative electrode.

While certain preferred embodiments of the galvanic cell according to the invention have been described and illustrated it will be understood that many modifications and variations may occur to the skilled in the art, particularly after benefiting from the present teaching, without departing from the spirit and scope of the present invention as defined in the appended claims.

I claim:

1. In a hermetically sealed galvanic alkaline smoothing cell, in combination, at least two porous electrode plates of potentially changeable opposite polarity, each of said electrode plates including active mass, said active mass of each of said electrodes consisting exclusively of the type usable as regular active mass of a negative electrode of an alkaline storage battery; a porous separator between and contacting adjacent electrodes of opposite polarity; and an alkaline electrolyte at least the major portion of which is fixed in the pores of said electrodes and said separator, said sealed cell being formed with a gas space in its interior being partly defined by surface portions of at least one of said electrodes, so that gases developed during operation of said cell may be consumed in contact with said surface portions.

2. The galvanic cell of claim 1, wherein said surface portions for consuming evolving gases are constituted by surface areas of the electrode which are not covered by the separator.

3. The galvanic cell of claim 1, wherein the electrode plates consist of metal containing sheets carrying the active material and having a thickness of about 0.1 mm. to 2 mm.

4. In a hermetically sealed alkaline galvanic smoothing cell, in combination, at least two porous sinter electrodes of potentially changeable opposite polarity, each of said sinter electrodes including identical active mass, said active mass of each of said sintering electrodes consisting exclusively of the type usable as regular active mass of a negative electrode of an alkaline storage battery; a porous separator between and contacting adjacent electrodes of opposite polarity; and an alkaline electrolyte at least the major portion of which being fixed in the pores of said electrodes and said separator, said sealed cell being formed with a gas space in its interior being partly defined by surface portions of at least one of said electrodes, so that gases developed during operation of said cell may be consumed in contact with said surface portions.

5. In a hermetically sealed alkaline galvanic smoothing cell, in combination, at least two porous electrode plates of potentially changeable opposite polarity, each of said electrode plates including identical active mass, said active mass of each of said electrode plates consisting exclusively of the type usable as regular active mass of a negative electrode of an alkaline storage battery and selected from the group consisting of cadmium oxide, cadmium hydroxide and mixtures thereof; a porous separator between and contacting adjacent electrodes of opposite polarity; and an alkaline electrolyte at least the major portion of which is fixed in the pores of said electrodes and said separator, said sealed cell being formed with a gas space in its interior being partly defined by surface portions of at least one of said electrodes, so that gases developed during operation of said cell may be consumed in contact with said surface portions.

References Cited in the file of this patent

UNITED STATES PATENTS

| | | |
|---|---|---|
| 1,437,470 | Kershaw | Dec. 5, 1922 |
| 2,282,979 | Murphy | May 12, 1942 |
| 2,361,533 | Endress et al. | Oct. 31, 1944 |
| 2,611,792 | Andre | Sept. 23, 1952 |
| 2,662,928 | Brennan | Dec. 15, 1953 |
| 2,697,737 | Goldberg et al. | Dec. 21, 1954 |
| 2,708,211 | Koren et al. | May 10, 1955 |
| 2,724,733 | Hagsphil et al. | Nov. 22, 1955 |

FOREIGN PATENTS

| | | |
|---|---|---|
| 165,982 | Australia | Nov. 14, 1955 |
| 741,345 | Great Britain | Nov. 30, 1955 |

OTHER REFERENCES

Vinal: Storage Batteries (1940), 3rd ed., John Wiley & Sons, pages 282–284, 285–289.